(12) United States Patent
Meyer et al.

(10) Patent No.: US 9,870,420 B2
(45) Date of Patent: Jan. 16, 2018

(54) CLASSIFICATION AND STORAGE OF DOCUMENTS

(71) Applicant: Google Inc., Mountain View, CA (US)

(72) Inventors: Cayden Meyer, New South Wales (AU); Joel Christopher Onofrio, New South Wales (AU)

(73) Assignee: GOOGLE LLC, Mountain View, CA (US)

( * ) Notice: Subject to any disclaimer, the term of this patent is extended or adjusted under 35 U.S.C. 154(b) by 324 days.

(21) Appl. No.: 14/599,793

(22) Filed: Jan. 19, 2015

(65) Prior Publication Data

US 2016/0210347 A1 Jul. 21, 2016

(51) Int. Cl.
*G06F 17/30* (2006.01)

(52) U.S. Cl.
CPC .. *G06F 17/30598* (2013.01); *G06F 17/30011* (2013.01); *G06F 17/30707* (2013.01)

(58) Field of Classification Search
CPC ......... G06F 17/30091; G06F 17/30115; G06F 17/2247
USPC .................... 707/378, 756, 769, 706; 726/23
See application file for complete search history.

(56) References Cited

U.S. PATENT DOCUMENTS

| | | | |
|---|---|---|---|
| 5,579,471 | A | 11/1996 | Barber et al. |
| 6,006,239 | A | 12/1999 | Bhansali et al. |
| 6,009,405 | A | 12/1999 | Leymann et al. |
| 6,119,165 | A | 9/2000 | Li et al. |
| 6,314,105 | B1 | 11/2001 | Luong |
| 6,449,688 | B1 | 9/2002 | Peters et al. |
| 6,507,845 | B1 | 1/2003 | Cohen et al. |
| 6,590,568 | B1 | 7/2003 | Astala et al. |
| 6,614,804 | B1 | 9/2003 | McFadden et al. |

(Continued)

FOREIGN PATENT DOCUMENTS

| | | |
|---|---|---|
| EP | 0371608 | 6/1990 |
| EP | 1275222 | 1/2003 |

(Continued)

OTHER PUBLICATIONS

ISR & Written Opinion, Re: Application # PCT/US2015/020375; dated Jun. 12, 2015.

(Continued)

*Primary Examiner* — Hung T Vy
(74) *Attorney, Agent, or Firm* — Young Basile Hanlon & MacFarlane, P.C.

(57) ABSTRACT

A method includes defining a plurality of known document types, obtaining a collection of previously classified documents that are each associated with one of the known document types, and extracting features from each document from the collection of previously classified documents to define feature information. The method also includes obtaining a subject document that is associated with a user, extracting one or more features from the subject document, comparing the one or more features from the subject document to the feature information, associating the subject document with one of the known document types based on the comparison, and transmitting the document to a cloud storage system for storage in a dedicated storage location that is associated with the user and contains only documents of the respective known document type that is associated with the subject document.

16 Claims, 5 Drawing Sheets

(56) References Cited

U.S. PATENT DOCUMENTS

| | | |
|---|---|---|
| 6,687,735 B1 | 2/2004 | Logston et al. |
| 6,711,557 B1 | 3/2004 | Palaniappan |
| 6,947,396 B1 | 9/2005 | Salmi |
| 7,030,861 B1 | 4/2006 | Westerman et al. |
| 7,113,917 B2 | 9/2006 | Jacobi et al. |
| 7,146,377 B2 | 12/2006 | Nowicki et al. |
| 7,386,576 B2 | 6/2008 | Watanabe et al. |
| 7,536,386 B2 | 5/2009 | Samji et al. |
| 7,620,902 B2 | 11/2009 | Manion et al. |
| 7,660,902 B2 | 2/2010 | Graham et al. |
| 7,711,771 B2 | 5/2010 | Kirnos |
| 7,756,821 B2 | 7/2010 | Havens et al. |
| 7,821,405 B2 | 10/2010 | Heidloff et al. |
| 7,827,299 B2 | 11/2010 | Cadarette et al. |
| 7,904,303 B2 | 3/2011 | Chien et al. |
| 7,908,183 B2 | 3/2011 | Jacobi et al. |
| 7,945,600 B1 | 5/2011 | Thomas et al. |
| 8,041,672 B2 | 10/2011 | Ogawa et al. |
| 8,132,111 B2 | 3/2012 | Baron et al. |
| 8,156,059 B2 | 4/2012 | Dunning et al. |
| 8,194,986 B2 | 6/2012 | Conwell |
| 8,196,047 B2 | 6/2012 | Fisher et al. |
| 8,285,700 B2 | 10/2012 | Steelberg et al. |
| 8,298,087 B1 | 10/2012 | Smith |
| 8,407,613 B2 | 3/2013 | Hope |
| 8,412,731 B2 | 4/2013 | Aubert et al. |
| 8,417,000 B1 | 4/2013 | Mendis |
| 8,429,565 B2 | 4/2013 | Agarawala et al. |
| 8,458,174 B1 | 6/2013 | Duerig |
| 8,464,184 B1 | 6/2013 | Cook et al. |
| 8,467,955 B2 | 6/2013 | Jiang et al. |
| 8,468,164 B1 | 6/2013 | Paleja et al. |
| 8,479,122 B2 | 7/2013 | Hotelling et al. |
| 8,504,565 B2 | 8/2013 | Pitts |
| 8,522,230 B2 | 8/2013 | Nathan et al. |
| 8,522,258 B1 | 8/2013 | Shaw |
| 8,532,400 B1 | 9/2013 | Babenko et al. |
| 8,547,352 B2 | 10/2013 | Park et al. |
| 8,548,844 B2 | 10/2013 | Steelberg et al. |
| 8,555,173 B2 | 10/2013 | Kast |
| 8,560,975 B2 | 10/2013 | Beaver et al. |
| 8,571,331 B2 | 10/2013 | Cifarelli |
| 8,584,022 B1 | 11/2013 | O'Shaughnessy et al. |
| 8,612,439 B2 | 12/2013 | Prahlad et al. |
| 8,612,470 B1 | 12/2013 | Fushman et al. |
| 8,624,836 B1 | 1/2014 | Miller et al. |
| 8,638,312 B2 | 1/2014 | Lim |
| 8,644,688 B2 | 2/2014 | Fishman et al. |
| 8,661,053 B2 | 2/2014 | Flynn et al. |
| 8,670,597 B2 | 3/2014 | Petrou et al. |
| 9,507,791 B2* | 11/2016 | Gunn .............. G06F 17/30126 |
| 2002/0054117 A1 | 5/2002 | van Dantzich et al. |
| 2002/0099844 A1 | 7/2002 | Baumann et al. |
| 2002/0112116 A1 | 8/2002 | Nelson |
| 2002/0116399 A1 | 8/2002 | Camps et al. |
| 2002/0167538 A1 | 11/2002 | Bhetanabhotla |
| 2002/0178271 A1 | 11/2002 | Graham et al. |
| 2002/0184375 A1 | 12/2002 | Wagner et al. |
| 2003/0184653 A1 | 10/2003 | Ohkubo |
| 2003/0208490 A1 | 11/2003 | Larrea et al. |
| 2004/0135904 A1 | 7/2004 | Shiota et al. |
| 2004/0189707 A1 | 9/2004 | Moore et al. |
| 2005/0033777 A1 | 2/2005 | Moraes et al. |
| 2005/0131992 A1 | 6/2005 | Goldstein et al. |
| 2006/0059174 A1 | 3/2006 | Mese et al. |
| 2006/0159127 A1 | 7/2006 | Childress et al. |
| 2006/0229932 A1 | 10/2006 | Zollo et al. |
| 2006/0242581 A1 | 10/2006 | Manion et al. |
| 2007/0250401 A1 | 10/2007 | Hearn et al. |
| 2008/0123904 A1 | 5/2008 | Sakamoto et al. |
| 2008/0126476 A1 | 5/2008 | Nicholas et al. |
| 2008/0165141 A1 | 7/2008 | Christie |
| 2008/0177623 A1 | 7/2008 | Fritsch et al. |
| 2008/0195956 A1 | 8/2008 | Baron et al. |
| 2008/0270398 A1 | 10/2008 | Landau et al. |
| 2009/0112868 A1 | 4/2009 | Rajamani et al. |
| 2009/0327975 A1 | 12/2009 | Stedman |
| 2010/0017426 A1 | 1/2010 | Marston |
| 2010/0046392 A1 | 2/2010 | Childress et al. |
| 2010/0070707 A1 | 3/2010 | Nishimura |
| 2010/0131523 A1* | 5/2010 | Yu .................. G06Q 10/107 707/756 |
| 2010/0161441 A1 | 6/2010 | Hounsell |
| 2010/0198802 A1* | 8/2010 | Kraftsow .......... G06F 17/30687 707/706 |
| 2010/0211575 A1 | 8/2010 | Collins et al. |
| 2010/0241971 A1 | 9/2010 | Zuber |
| 2010/0250337 A1 | 9/2010 | Kassaei |
| 2010/0251305 A1 | 9/2010 | Kimble et al. |
| 2010/0256981 A1 | 10/2010 | Nielsen et al. |
| 2010/0332846 A1 | 12/2010 | Bowden et al. |
| 2010/0332958 A1 | 12/2010 | Weinberger et al. |
| 2011/0010672 A1 | 1/2011 | Hope |
| 2011/0044512 A1 | 2/2011 | Bambha et al. |
| 2011/0162070 A1* | 6/2011 | Krasser .............. G06F 21/56 726/23 |
| 2011/0208668 A1 | 8/2011 | Phillips |
| 2011/0289423 A1 | 11/2011 | Kim et al. |
| 2012/0032436 A1 | 2/2012 | Zantout et al. |
| 2012/0072449 A1 | 3/2012 | Patch et al. |
| 2012/0078845 A1 | 3/2012 | Kasbekar et al. |
| 2012/0084689 A1 | 4/2012 | Ledet et al. |
| 2012/0089610 A1 | 4/2012 | Agrawal et al. |
| 2012/0096046 A1 | 4/2012 | Kucera |
| 2012/0136936 A1 | 5/2012 | Quintuna |
| 2012/0192086 A1 | 7/2012 | Ghods et al. |
| 2012/0197980 A1 | 8/2012 | Terleski et al. |
| 2012/0213404 A1 | 8/2012 | Steiner |
| 2012/0233227 A1 | 9/2012 | Alexander et al. |
| 2012/0254332 A1 | 10/2012 | Irvin |
| 2012/0290609 A1* | 11/2012 | Britt .................. G06Q 30/06 707/769 |
| 2012/0290926 A1 | 11/2012 | Kapadia et al. |
| 2012/0290947 A1 | 11/2012 | Baggett et al. |
| 2012/0303477 A1 | 11/2012 | Ben-Itzhak |
| 2012/0303684 A1 | 11/2012 | Sakurai et al. |
| 2012/0324368 A1 | 12/2012 | Putz et al. |
| 2013/0014023 A1 | 1/2013 | Lee et al. |
| 2013/0024464 A1 | 1/2013 | Berner et al. |
| 2013/0073976 A1 | 3/2013 | McDonald et al. |
| 2013/0080940 A1 | 3/2013 | Reeves et al. |
| 2013/0104080 A1 | 4/2013 | Bosworth et al. |
| 2013/0132896 A1 | 5/2013 | Lee et al. |
| 2013/0138674 A1 | 5/2013 | Jeong et al. |
| 2013/0138685 A1 | 5/2013 | Brucher et al. |
| 2013/0173637 A1 | 7/2013 | Kim et al. |
| 2013/0185638 A1 | 7/2013 | Tischer |
| 2013/0188886 A1 | 7/2013 | Petrou et al. |
| 2013/0202198 A1 | 8/2013 | Adam et al. |
| 2013/0226876 A1* | 8/2013 | Gati .............. G06F 17/30079 707/652 |
| 2013/0263289 A1 | 10/2013 | Vijayan et al. |
| 2013/0339435 A1 | 12/2013 | De Armas |
| 2014/0019317 A1 | 1/2014 | Casares et al. |
| 2014/0019910 A1 | 1/2014 | Kim et al. |
| 2014/0029798 A1 | 1/2014 | Flynn et al. |
| 2014/0067702 A1 | 3/2014 | Rathod |
| 2014/0068443 A1 | 3/2014 | Eng et al. |
| 2014/0164535 A1 | 6/2014 | Lynch et al. |
| 2014/0236722 A1 | 8/2014 | Rathus et al. |
| 2014/0258350 A1* | 9/2014 | Duval .............. G06F 17/30174 707/829 |
| 2014/0317552 A1 | 10/2014 | Romatoski |
| 2015/0032480 A1* | 1/2015 | Blackhurst .......... G06Q 40/08 705/4 |
| 2015/0039997 A1* | 2/2015 | Tanaka .............. G06F 3/0486 715/234 |
| 2015/0096024 A1* | 4/2015 | Haq .................. H04L 63/145 726/23 |
| 2015/0193521 A1 | 7/2015 | Schoeffler et al. |
| 2015/0363062 A1 | 12/2015 | Gunn |
| 2015/0363640 A1 | 12/2015 | Meyer |

(56) References Cited

U.S. PATENT DOCUMENTS

FOREIGN PATENT DOCUMENTS

| EP | 2187322 A1 | 5/2010 |
| EP | 2458512 | 5/2012 |
| WO | WO2000051021 | 0/0000 |
| WO | WO2003090096 | 0/0000 |
| WO | WO2007085083 | 8/2007 |
| WO | WO2009032712 | 3/2009 |
| WO | WO2012092025 | 7/2012 |

OTHER PUBLICATIONS

ISR & Written Opinion, Re: Application #PCT/US2015/020378 dated Aug. 18, 2015.
Automatic Album Maker Moment.me Arrives on Android, Adds a "Manual Mode" Mode to Boost Engagement, TechCrunch, Feb. 18, 2013, http://techcrunch.com/2013/02/18/automatic-album-maker-moment-me-arrives-on-android-adds-a-manual-mode-mode-to-boost-engagement/.
Flayvr, A. Mobile App That Automatically Creates Photo Albums, Raises $450K Seed Round, TechCrunch, Oct. 4, 2012, http://techcrunch.com/2012/10/04/flayvr-a-mobile-app-that-automatically-creates-photo-albums-raises-450k-seed-round/.
ISR and Written Opinion of the International Searching Authority for International Application No. PCT/US2015010618, dated Mar. 25, 2015.
Larson, Michael, "Probing Network Characteristics: A Distributed Network Performance Framework", Dr. Dobb's Journal, Jun. 2004, pp. 22-29.
Lowe, D., "Object recognition from local scale-invariant features," International Conference on Computer Vision Corfu, Greece (Sep. 1999) pp. 1150-1157.

* cited by examiner

CLASSIFICATION AND STORAGE OF DOCUMENTS

BACKGROUND

Users of computing devices often receive documents through various channels. For example, documents can be received as attachments to email messages, by downloading the documents from an internet location, or by capturing an image of the document using a camera. The process of manually sorting these documents and transferring them to a storage system can be time-consuming. For this reason, many documents are not stored in a logical or useful manner, and cannot be located when they are needed.

SUMMARY

The disclosure relates generally to classification and storage of documents.

One aspect of the disclosed embodiments a method that includes defining a plurality of known document types, obtaining a collection of previously classified documents that are each associated with a respective document type from the plurality of known document types, and extracting features from each document from the collection of previously classified documents to define feature information describing features extracted from the collection of previously classified documents. The method also includes obtaining a subject document that is associated with a user, extracting one or more features from the subject document, comparing the one or more features from the subject document to the feature information, associating the subject document with one of the known document types based on the comparison of the one or more features from the subject document to the feature information, and transmitting the document to a cloud storage system for storage in a dedicated storage location that is associated with the user and contains only documents of the respective known document type that is associated with the subject document.

Another aspect of the disclosed embodiments is an apparatus that includes a memory and a processor configured to execute instructions stored in the memory to define a plurality of known document types, obtain a collection of previously classified documents that are each associated with a respective document type from the plurality of known document types, and extract features from each document from the collection of previously classified documents to define feature information describing features extracted from the collection of previously classified documents. The processor is also configured to execute instructions stored in the memory to obtain a subject document that is associated with a user, extract one or more features from the subject document, compare the one or more features from the subject document to the feature information, associate the subject document with one of the known document types based on the comparison of the one or more features from the subject document to the feature information, and transmit the document to a cloud storage system for storage in a dedicated storage location that is associated with the user and contains only documents of the respective known document type that is associated with the subject document.

Another aspect of the disclosed embodiments is a method includes obtaining a document that is associated with a user and extracting one or more features from the document. The method also includes comparing the one or more features from the document to receipt feature information describing features extracted from a collection of sales receipts and determining that the document is a sales receipt based on the comparison of one or more features from the document to the receipt feature information. The method also includes transmitting the document to a cloud storage system for storage in a dedicated receipt storage location that is associated with the user.

Another aspect of the disclosed embodiments is a apparatus that includes a memory; and a processor configured to execute instructions stored in the memory to obtain a document that is associated with a user, extract one or more features from the document, compare the one or more features from the document to receipt feature information describing features extracted from a collection of sales receipts, determine that the document is a sales receipt based on the comparison of one or more features from the document to the receipt feature information, and transmit the document to a cloud storage system for storage in a dedicated receipt storage location that is associated with the user.

BRIEF DESCRIPTION OF THE DRAWINGS

The description herein makes reference to the accompanying drawings wherein like reference numerals refer to like parts throughout the several views, and wherein.

DETAILED DESCRIPTION

According to the methods, systems, apparatuses, and computer programs that are discussed herein, documents are classified automatically based on features in the documents, and are stored in dedicated storage locations based on how they are classified. The teachings herein can be applied to collections of unclassified documents that are associated with a particular user, such as documents that are attached to email messages, and photographs that are stored in a collection that is associated with the user.

Figure 1:
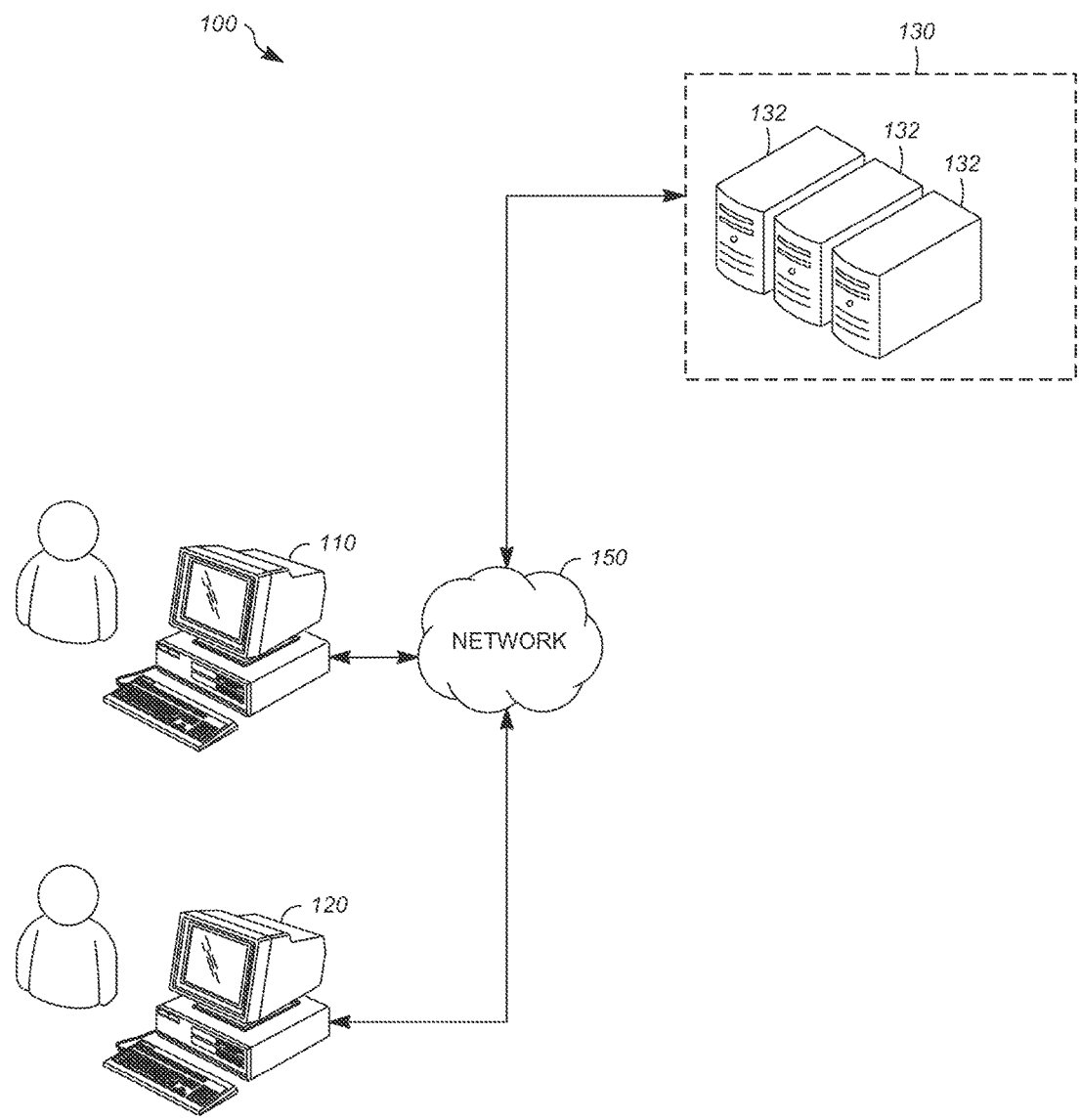
FIG. 1 is a block diagram showing an example of an environment in which a system for classification and storage of documents can be implemented.

FIG. 1 shows an example of an environment 100 in which a system for classification and storage of documents can be implemented. The environment 100 can include a user system 110, one or more additional user systems 120, and an application hosting service 130. The user system 110 and the additional user systems 120 are each representative of a large number (e.g. millions) of systems that can be included in the environment 100, with each system being able to utilize one or more applications that are provided by the application hosting service 130. The user system 110 and the additional user systems 120 can each be any manner of computer or computing device, such as a desktop computer, a laptop computer, a tablet computer, or a smart-phone (a computationally-enabled mobile telephone). The application hosting service 130 can be implemented using one or more server computers 132. The user system 110, the additional user systems 120, and the application hosting service 130 can each be implemented as a single system, multiple systems, distributed systems, or in any other form.

The systems, services, servers, and other computing devices described here are in communication via a network 150. The network 150 can be one or more communications networks of any suitable type in any combination, including wireless networks, wired networks, local area networks, wide area networks, cellular data networks, and the internet.

The application hosting service 130 can provide access to one or more hosted applications to a defined group of users including operators associated with the user system 110 and the additional user systems 120. One of the hosted applications is a cloud storage service that allows users to access, store, organize, and store electronic documents of all types. The cloud storage service implements user accounts so that documents stored at the cloud storage service by the user are associated with the user, who is considered the owner of the document. The cloud storage service also implements user-specified access control that allows the user to grant other users access to documents (i.e. "share"). The hosted applications can also include an electronic mail system and a photo storage system. With respect to any of the hosted applications, the application hosting service can be operable to transmit information to the user system 110 that, when interpreted by the user system 110, causes the user system 110 to output an interface screen of the respective hosted application for display on a display device that is associated with that user system 110.

Figure 2:
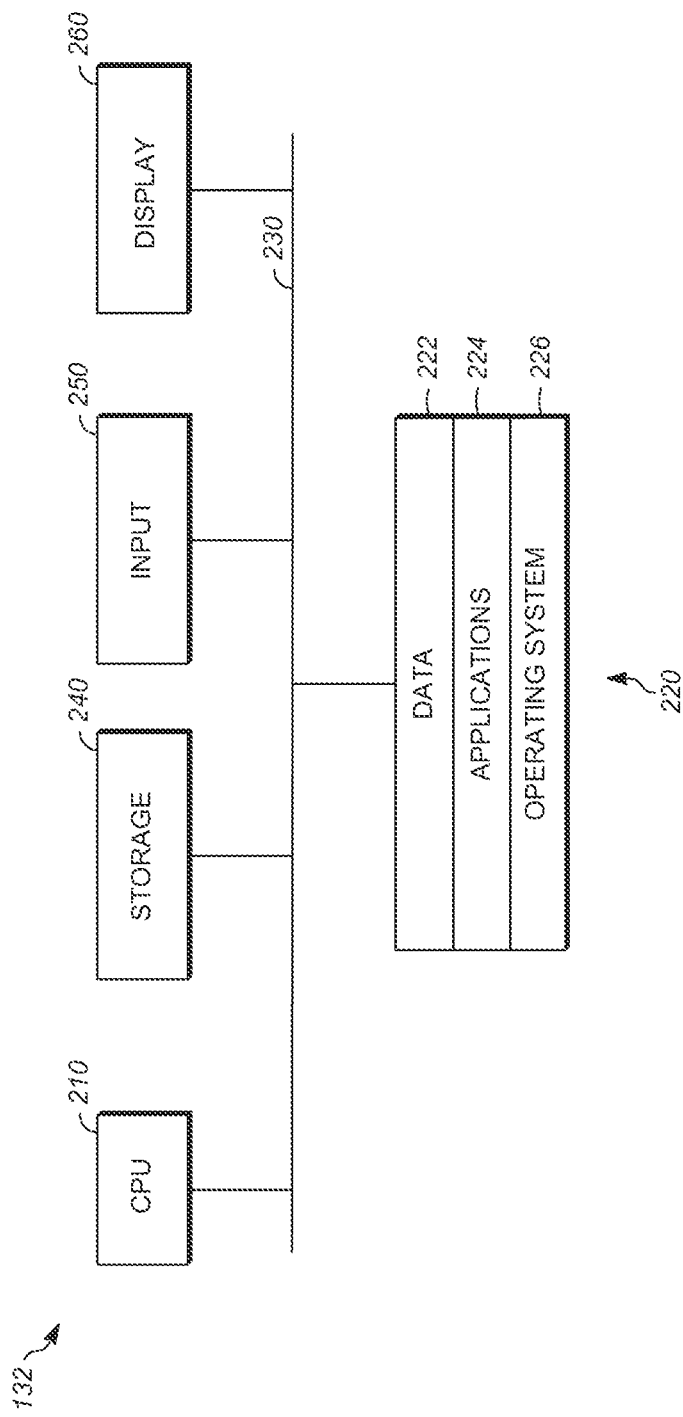
FIG. 2 is a block diagram showing an example of a hardware configuration for a server computer.

FIG. 2 is a block diagram of an example of a hardware configuration for the one or more server computers 132 of FIG. 1. The same hardware configuration or a similar hardware configuration can be used to implement the user system 110 and the additional user systems 120. Each server computer 132 can include a CPU 210. The CPU 210 can be a conventional central processing unit. Alternatively, the CPU 210 can be any other type of device, or multiple devices, capable of manipulating or processing information now-existing or hereafter developed. Although the disclosed examples can be practiced with a single processor as shown, e.g. CPU 210, advantages in speed and efficiency can be achieved using more than one processor.

Each server computer 132 can include memory 220, such as a random access memory device (RAM). Any other suitable type of storage device can also be used as the memory 220. The memory 220 can include code and data 222 that can be accessed by the CPU 210 using a bus 230. The memory 220 can further include one or more application programs 224 and an operating system 226. The application programs 224 can include software components in the form of computer executable program instructions that cause the CPU 210 to perform the operations and methods described here.

A storage device 240 can be optionally provided in the form of any suitable computer readable medium, such as a hard disc drive, a memory device, a flash drive, or an optical drive. One or more input devices 250, such as a keyboard, a mouse, or a gesture sensitive input device, receive user inputs and can output signals or data indicative of the user inputs to the CPU 210. One or more output devices can be provided, such as a display device 260. The display device 260, such as a liquid crystal display (LCD) or a cathode-ray tube (CRT), allows output to be presented to a user, for example, in response to receiving a video signal.

Although FIG. 2 depicts the CPU 210 and the memory 220 of each server computer 132 as being integrated into a single unit, other configurations can be utilized. The operations of the CPU 210 can be distributed across multiple machines (each machine having one or more of processors) which can be coupled directly or across a local area or other network. The memory 220 can be distributed across multiple machines such as network-based memory or memory in multiple machines. Although depicted here as a single bus, the bus 230 of each of each server computer 132 can be composed of multiple buses. Further, the storage device 240 can be directly coupled to the other components of the respective server computer 132 or can be accessed via a network and can comprise a single integrated unit such as a memory card or multiple units such as multiple memory cards. The one or more server computers can thus be implemented in a wide variety of configurations.

Figure 3:
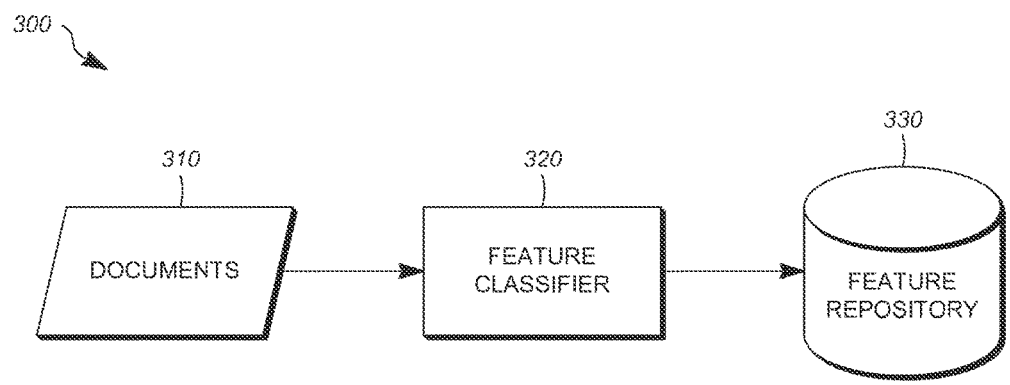
FIG. 3 is a block diagram showing a system for defining a feature repository using a collection of previously classified documents.

FIG. 3 is a block diagram showing a system 300 in which a collection of documents 310 are provided as an input to a feature classifier 320 that defines a feature repository 330 as an output. In the system 300, a plurality of known document types are defined. As one example, one of the known document types can correspond to sales receipts (i.e. writings that acknowledge payment for goods or services). As another example, another of the known document types can correspond to bills, invoices, or similar documents. Other document types can be utilized.

The documents in the collection of documents 310 can be of many varied types. The documents from the collection of documents 310 include text and/or numerals in form of encoded characters or images of characters. As one example, the documents from the collection of documents 310 can be stored in any of a number of well-known alphanumeric electronic document formats that contain text encoded in a scheme that represents characters including letters and numbers, such as the ASCII character encoding scheme. As another example, the documents 310 from the collection of documents can be images (e.g. raster images or vector images) that include alphanumeric characters.

Each document from the collection of documents 310 is classified prior to being provided to the feature classifier 320. Documents are classified, for example, by being associated with a respective document type from the plurality of known document types. For example, each of the documents can be manually associated with one of the known document types by a user prior to the time at which the collection of documents 310 is provided to the feature classifier 320 as an input. In one implementation, a user could be presented with an interface screen (e.g. a dialog box) that includes a list of two of more known document types from the plurality of document types, and requests a user input in the form of a selection of one of the document types from the list. As another example, the user could be presented with an interface screen that identifies a single document type from the plurality of document types and requests a user input that identifies whether the currently displayed document corresponds to the identified single document type. Other methods of classifying the documents can be utilized to associate each of the documents with one of the known document types prior to the time at which the collection of documents 310 is provided to the feature classifier 320.

The feature classifier 320 extracts one or more features from each document from the plurality of documents and encodes the features as feature information describing the features from the document. By identifying features in the documents from the collection of documents 310, patterns can be identified that allow unclassified documents to be classified based on the presence and/or absence of certain features in them.

The features of the documents that are identified and extracted by the feature classifier 320 include substantive features, formatting features, and other aspects or characteristics of the documents or portions of the documents that can be utilized as a basis for classifying and identifying documents. For example, the features can be alphanumeric text-based features that include at least one of text size, text font, text positioning, or substantive text content. For documents in image-based file formats, optical character recognition can be utilized to convert image-based text elements into encoded characters to extract substantive text content features.

The output of the feature classifier 320 is feature information, which is stored in the feature repository 330 for later use. The feature information includes information that identifies a feature and allows similar features to be matched to it, as well as information identifying the document classification that the feature was found in. Thus, the feature information from the feature repository can be utilized to match features is unclassified documents to known features, and these matches therefore indicate relatedness of an unclassified document to one or more of the known document types, as will be explained further herein.

In one implementation, the feature classifier 320 can employ machine learning techniques as a basis for extracting and classifying features. In another implementation, the feature classifier 320 can employ machine learning and templating as a basis for extracting and classifying features.

Figure 4:
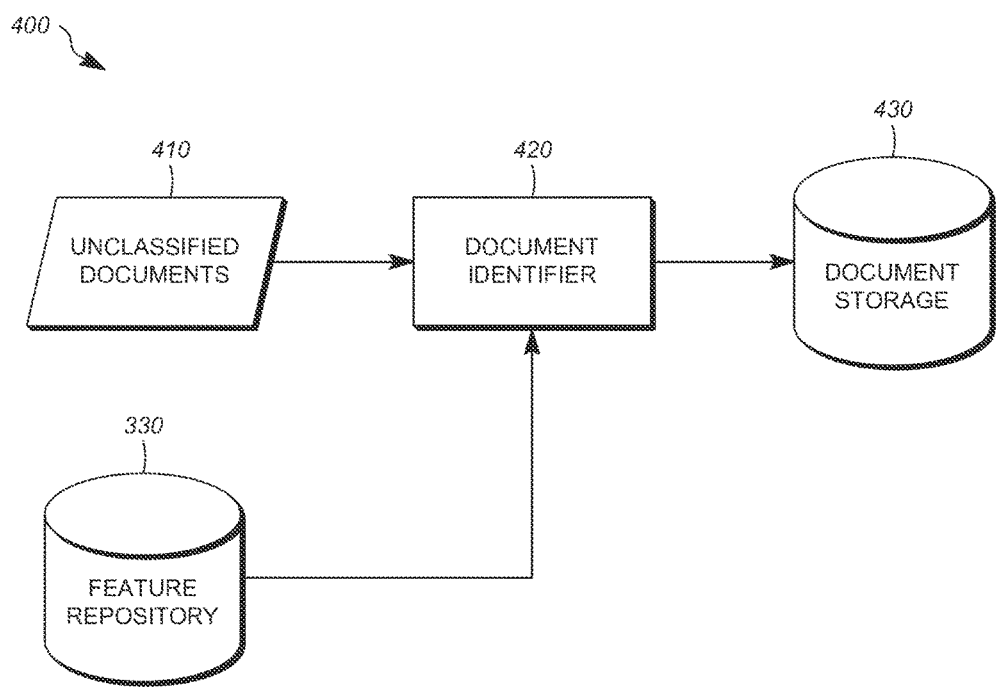
FIG. 4 is a block diagram showing a system for identifying and storing unclassified documents using the feature repository.

FIG. 4 is a block diagram showing a system 400 in which one or more unclassified documents 410 are classified and stored by a document identifier 420 using the feature repository 330, which is also available to the document identifier 420 as an input.

The unclassified documents 410 are obtained by the document identifier 420 as inputs. The unclassified documents 410 can be of many varied types, as explained with respect to the documents from the collection of documents 310. The unclassified documents 410 can be obtained in a number of different ways. In some implementations, the unclassified documents 410 are obtained from a collection of documents that are associated with a user, such as being stored on a device owned by a user or being stored at a server using an account associated with the user, such as an email account.

In one example, the unclassified documents 410 are attachments to email messages. In this example, obtaining the unclassified documents 410 can include accessing one or more email messages that are stored at an electronic mail server and are associated with an electronic mail account that is associated with the user (e.g. owned by the user or controlled primarily by the user). The accessed messages can be messages that are received at the electronic mail server via a protocol such as the SMTP protocol, with the user being identified as the recipient of the messages. A software component can monitor the messages that are received at the electronic mail server and transmit email attachments to a location that is accessible by the document identifier 420 for storage as the unclassified documents 410 until they are obtained by the document identifier and processed by the document identifier 420. In some implementations the email messages are transmitted with the email attachments so that the contents of the messages themselves can be utilized in classifying the attachments. Thus, the system 400 can automatically process the email messages and/or email attachments without initiation of a classification process by the user.

In another example, the unclassified documents 410 are photographs. In this example, obtaining the unclassified documents 410 can include accessing photographs that are associated with the user. The photographs can be part of a collection of photographs that are stored at a device associated with the user, or stored at a cloud based storage system in a location that is associated with the user. The collection of photographs can be monitored, such as by a software component, and newly added photographs can be transmitted to a location that is accessible by the document identifier 420 for storage as the unclassified documents 410 until they are obtained by the document identifier and processed by the document identifier 420. Thus, the system 400 can automatically process newly captured or stored images without initiation of a classification process by the user.

The document identifier 420 extracts features from the unclassified documents 410. This can be done in the manner described with respect to the feature classifier 320. The document identifier 420 then utilizes the feature repository 330 to determine whether each of the subject documents corresponds to one of the known document types by comparing the extracted features to the feature information. For example, the document identifier 420 can select a subject document from the unclassified documents 410, extract one or more features from the subject document, and compare the one or more extracted to the features that are extracted from the subject document to the feature information that is stored in the feature repository 330. This comparison can be performed using known techniques such as machine learning and/or pattern matching techniques. The result of this comparison can be an identification of one or more of the known document types that the subject document is related to.

In one implementation, a score is determined for the subject document with respect to each of several of the known document types, where each score represents a probability that the subject document corresponds to that particular document type (i.e. is the same type of document). One of the known document types can be selected based on this score. One simple example of an algorithm for selecting one of the known document types simply selects the highest ranked known document type. Other algorithms can be utilized to select one of the known document types.

In some implementations, a determination is made as to whether the result is considered to be valid or invalid. Such a determination can be made on the basis of one or more individual tests. One such test can determine whether the score for the highest ranked document type exceeds a threshold value. If the score for the highest ranked document type does not exceed the threshold value, the result is determined to be invalid. Another such test can determine whether the two highest ranked document types differ by less than a threshold value (e.g. a margin of error). If the two highest ranked document types differ by less than the threshold value, the result is determined to be invalid. If the process produces a valid result, the subject document is associated with the known document type. This association can be made automatically without user input that selects the known document type. The document identifier 420 then causes the subject document to be associated with the known document type. If the process does not produce a valid result, the document identifier 420 does not automatically associate the subject document with the known document type. In some implementations, the document identifier 420 can then prompt the user to manually classify the subject document by selecting one of the known document types from a list or by creating a new document type.

After the subject document is associated with the known document type, the document identifier 420 causes the subject document to be stored in association with the known document type. In one example, storing the subject document in association with the known document includes transferring the subject document to a document storage system 430 for storage in a manner that allows the subject document to be located and retrieved on the basis of its document type. In one implementation, the document identifier 420 causes storage of the subject document at the document storage system 430 automatically without user input. In another implementation, the document identifier 420 causes display, to the user, of an interface that asks the user whether the subject document should be stored at the document storage system 430.

One example of storing the subject document in association with its document type includes storing the subject document in a dedicated storage location at the document storage system 430 that contains only documents from the same document type. The dedicated storage location can be a folder in a hierarchical storage structure that stores only documents from a single document type. Non-hierarchical storage systems can also be used to cause documents of the same known document type to be stored together. For example, such a system can store metadata for the subject document that identifies the document type of the document. This metadata can be utilized by the document storage system 430 to define and cause display or a folder based collection or criteria-based collection containing only documents from a single specified document type.

In one implementation, the document storage system 430 is a cloud storage system that stores documents of each known document type in a dedicated storage location that is associated with the user and contains only documents of the respective known document type that is associated with the subject document. The dedicated storage location can be associated with the user by virtue of a user account that gives the user at least partial control over the dedicated storage location. The control provided to the user can include the ability to set access control in order to deny or grant others access to the dedicated storage location.

The system 400 can be applied to documents of many types. In one implementation, one of the known document types corresponds to sales receipts, and the feature repository 330 includes classified features from sales receipts that are useful for determining whether a subject document is a sales receipt.

As one example, a user might receive one or more email messages that contain sales receipts, either in the body of the email message itself, or as an attachment in a format such as an image file format, a word processing document file format, or an application independent document display file format such as the PDF file format. These documents are processed by the document identifier 420, and any documents that are identified as sales receipts are stored at the document storage system 430, such as by causing a copy of the documents to be created at the document storage system 430. Although the examples given previously all concern situations where features in a document indicate that the document itself is of a known type, it should be understood that features in an email message can be processed to determine that an attachment to the email message corresponds to a known document type, in which case the attachment is classified based on the features in the email message, and the attachment can then be stored at the document storage system 430.

As another example, a user might utilize a camera to take photographs of one or more sales receipts and store these photographs in a collection of images that includes other types of images as well. The document identifier 420 processes these images as previously described. Optical character recognition can be utilized to identify and extract text from the images for the purpose of feature classification. The document identifier 420, upon determining that at least some of the documents are sales receipts, causes those documents to be stored at the document storage system 430.

Figure 5:
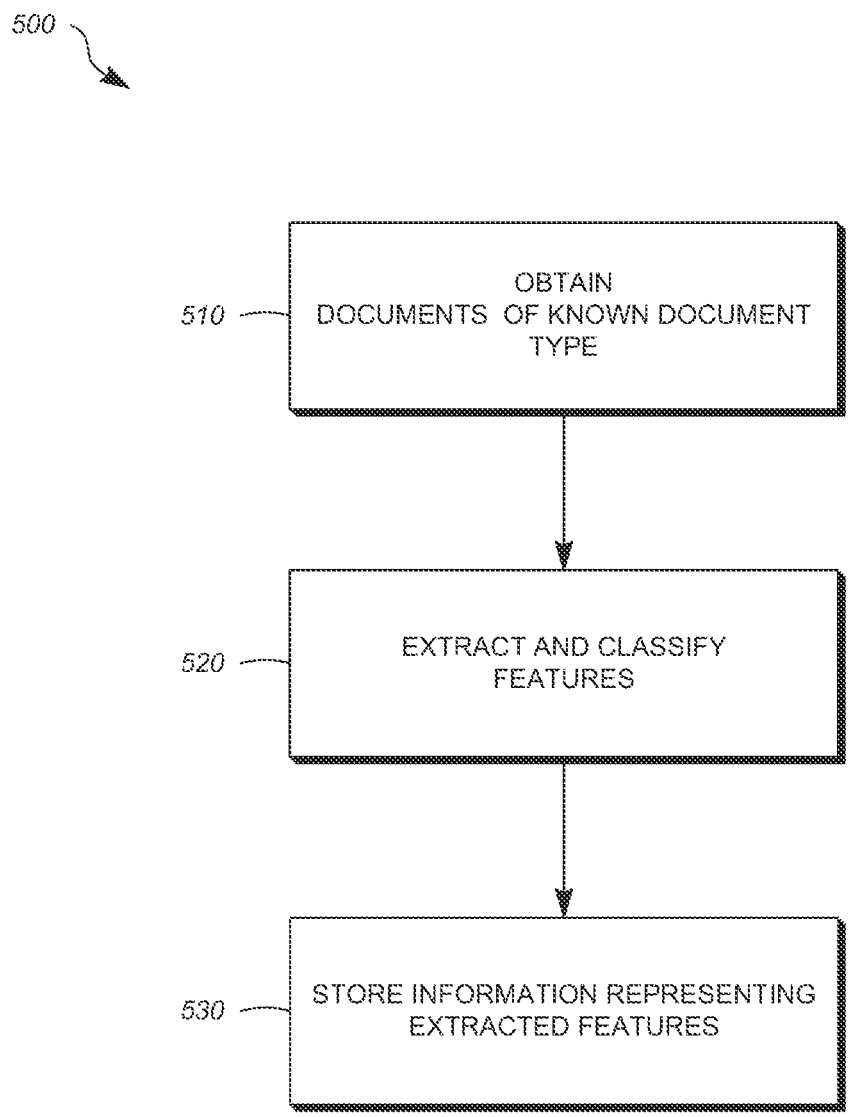
FIG. 5. is a flowchart showing an example of a process for defining the feature repository.

FIG. 5 is a flowchart showing an example of a process 500 for defining a feature repository such as the feature repository 330. The operations described in connection with the process 500 can be performed at one or more computers, such as at the one or more server computers 132 of the application hosting service 130, or at the user system 110. When an operation is described as being performed by one or more computers, it is completed when it is performed by one computer working alone, or by multiple computers working together. The operations described in connection with the process 500 can be embodied as a non-transitory computer readable storage medium including program instructions executable by one or more processors that, when executed, cause the one or more processors to perform the operations. For example, the operations described in connection with the process 500 can be stored at the memory 220 of one of the server computers 132 and for execution by the CPU 210 thereof.

In operation 510, documents of known types are obtained. The documents obtained at operation 510 can be documents that were previously classified, such as by a manual process. In operation 520, the documents that were obtained at operation 510 are classified, such as by providing those documents to a feature classification system such as described with respect to the feature classifier 320. In operation 530, information representing the features that were extracted and classified at operation 520 is stored. This can be performed, for example, as described with respect to storage of feature information at the feature repository 330.

Figure 6:
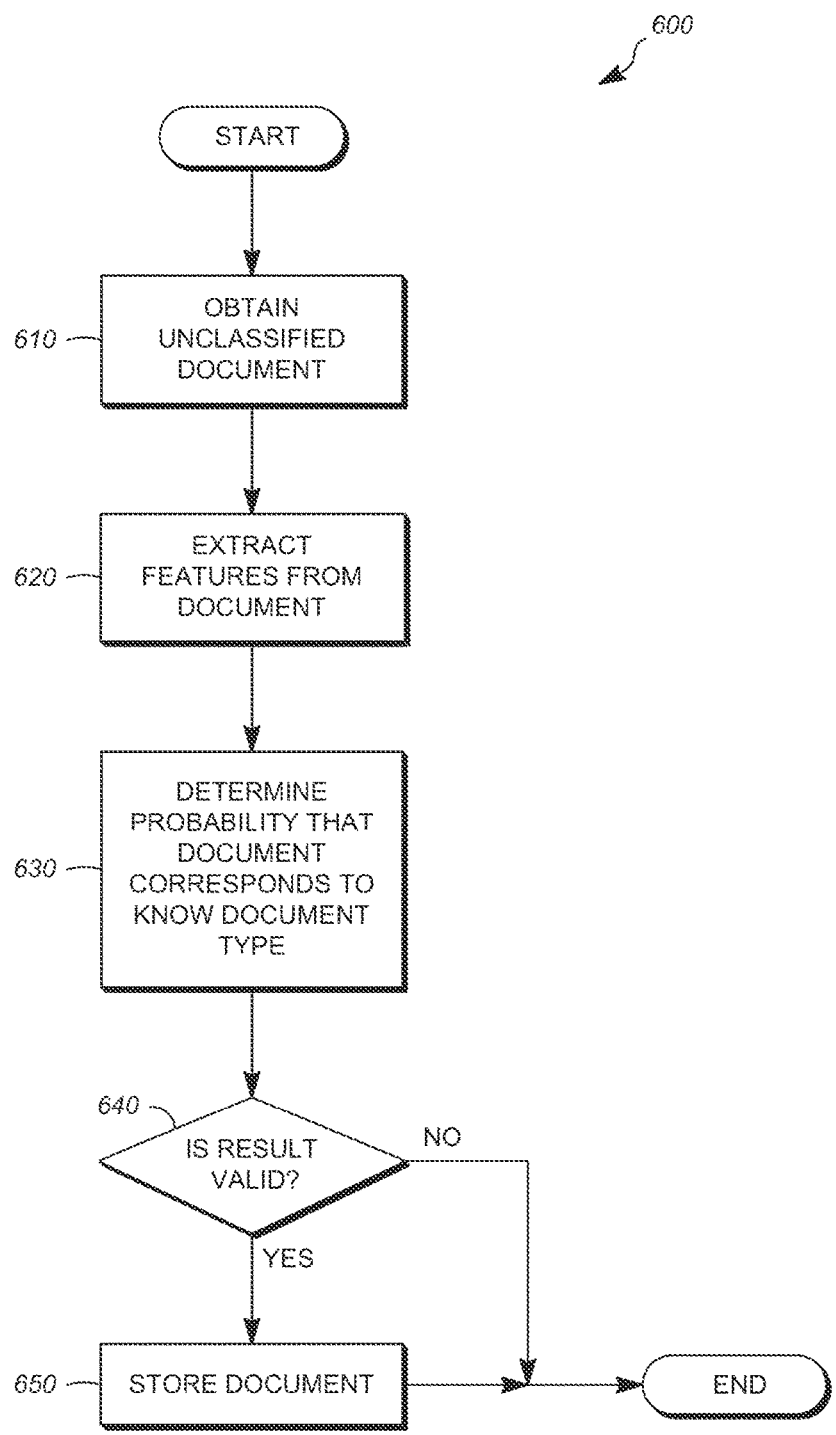
FIG. 6 is a flowchart showing an example of a process for identifying and storing unclassified documents.

FIG. 6 is a flowchart showing an example of a process 600 for identifying and storing unclassified documents. The operations described in connection with the process 600 can be performed at one or more computers, such as at the one or more server computers 132 of the application hosting service 130, or at the user system 110. When an operation is described as being performed by one or more computers, it is completed when it is performed by one computer working alone, or by multiple computers working together. The operations described in connection with the process 600 can be embodied as a non-transitory computer readable storage medium including program instructions executable by one or more processors that, when executed, cause the one or more processors to perform the operations. For example, the operations described in connection with the process 600 can be stored at the memory 220 of one of the server computers 132 for execution by the CPU 210 thereof.

In operation 610, unclassified documents are obtained. This can be performed in the manner described with respect to the unclassified documents 410. In operation 620, the documents that were obtained at operation 610 are provided to a feature extraction system that extracts features that can be used as a basis for identifying the documents. At operation 630, a determination is, for each of the documents, as to the probability that the document corresponds to a known document type. Operations 620 and 630 can be performed as described with respect to the document identifier 420. In operation 640, a determination is made as to whether the determination of the document type at operation 630 is valid. This can be performed by analyzing the probabilities computed at operation 630 using one or more rules, as previously described. If the determination is not valid, the document type identified at operation 630 is not utilized as a basis for storing the document. At this point the process ends or, alternatively, the user can be prompted to input information that can be used for properly identifying and storing the document. If operation 640 determines that the document type identified at operation 630 is valid, the document is stored in association with the document type at operation 650. This can be performed, for example, in the manner described with respect to the document storage system 430.

The foregoing description describes only some exemplary implementations of the described techniques. Other implementations are available. For example, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The implementations of the computer devices (e.g., clients and servers) described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of each of the clients and each of the servers described herein do not necessarily have to be implemented in the same manner.

Operations that are described as being performed by a single processor, computer, or device can be distributed across a number of different processors, computers or devices. Similarly, operations that are described as being performed by different processors, computers, or devices can, in some cases, be performed by a single processor, computer or device.

Although features may be described above or claimed as acting in certain combinations, one or more features of a combination can in some cases be excised from the combination, and the combination may be directed to a sub-combination or variation of a sub-combination.

The systems described herein, such as client computers and server computers, can be implemented using general purpose computers/processors with a computer program that, when executed, carries out any of the respective methods, algorithms and/or instructions described herein. In addition or alternatively, for example, special purpose computers/processors can be utilized which can contain specialized hardware for carrying out any of the methods, algorithms, or instructions described herein.

Some portions of above description include disclosure presented in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality. It should be noted that the process steps and instructions of implementations of this disclosure could be embodied in software, firmware or hardware, and when embodied in software, could be downloaded to reside on and be operated from different platforms used by real time network operating systems.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

At least one implementation of this disclosure relates to an apparatus for performing the operations herein. This apparatus may be specially constructed for the required purposes, or it may comprise a general-purpose computer selectively activated or reconfigured by a computer program stored on a computer readable storage medium that can be accessed by the computer.

All or a portion of the embodiments of the disclosure can take the form of a computer program product accessible from, for example, a non-transitory computer-usable or computer-readable medium. The computer program, when executed, can carry out any of the respective techniques, algorithms and/or instructions described herein. A non-transitory computer-usable or computer-readable medium can be any device that can, for example, tangibly contain, store, communicate, or transport the program for use by or in connection with any processor. The non-transitory medium can be, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for tangibly containing, storing, communicating, or transporting electronic instructions.

It is to be understood that the disclosure is not to be limited to the disclosed embodiments but, on the contrary, is intended to cover various modifications and equivalent arrangements included within the spirit and scope of the appended claims.

What is claimed is:

1. A method comprising:
defining a plurality of known document types that are each associated with feature information that is determined for a respective known document type by extracting features from manually classified documents that were each identified as corresponding to the respective known document type by a manual classification input;
monitoring an email account associated with a user to detect that an email message has been received at the email account associated with the user, wherein a subject document is included as an attachment to the email message; and
processing the subject document without action by the user, in response to detecting that the email message has been received, including the steps of:
extracting one or more features from the subject document,
comparing the one or more features from the subject document to the feature information,
determining a document type of the subject document from the plurality of known document types based on the comparison of the one or more features from the subject document to the feature information,
selecting a dedicated storage location at a cloud storage system from a plurality of dedicated storage locations associated with the user based on the respective known document type that is associated with the subject document, wherein each of the plurality of dedicated storage locations corresponds to a respective folder of a hierarchical storage structure of the cloud storage system, and wherein the selected dedicated storage location is associated with the user and contains only documents of the respective known document type, and
transmitting the subject document to a cloud storage system for storage in the selected dedicated storage location.

2. The method of claim 1, wherein the subject document is a photograph.

3. The method of claim 1, wherein the one or more features are alphanumeric text-based features that include at least one of text size, text font, text positioning, or substantive text content.

4. An apparatus comprising:
a memory; and
a processor configured to execute instructions stored in the memory to:
define a plurality of known document types that are each associated with feature information that is determined for a respective known document type by extracting features from manually classified documents that were each identified as corresponding to the respective known document type by a manual classification input,
monitor an email account associated with a user to detect that an email message has been received at the email account associated with the user, wherein a subject document is included as an attachment to the email message, and
process the subject document without action by the user, in response to detecting that the email message has been received, by executing further instruction stored in the memory to:
extract one or more features from the subject document,
compare the one or more features from the subject document to the feature information,
determine a document type of the subject document from the plurality of known document types based on the comparison of the one or more features from the subject document to the feature information,
select a dedicated storage location at a cloud storage system from a plurality of dedicated storage locations associated with the user based on the respective known document type that is associated with the subject document, wherein each of the plurality of dedicated storage locations corresponds to a respective folder of a hierarchical storage structure of the cloud storage system, and wherein the selected dedicated storage location is associated with the user and contains only documents of the respective known document type, and
transmit the subject document to a cloud storage system for storage in the selected dedicated storage location.

5. The apparatus of claim 4, wherein the subject document is a photograph.

6. The apparatus of claim 4, wherein the one or more features are alphanumeric text-based features that include at least one of text size, text font, text positioning, or substantive text content.

7. A method comprising:
obtaining a document that is associated with a user;
extracting one or more features from the document, wherein the one or more features are alphanumeric text-based features that include at least one of text size, text font, text positioning, or substantive text content;
comparing the one or more features from the document to receipt feature information describing features extracted from a collection of sales receipts;
determining that a document of type of the document is a sales receipt from a plurality of known document types based on the comparison of one or more features from the document to the receipt feature information;
selecting a dedicated storage location at a cloud storage system from a plurality of dedicated storage locations associated with the user based on the determination that the document is a sales receipt, wherein each of the plurality of dedicated storage locations corresponds to a respective folder of a hierarchical storage structure of the cloud storage system, and wherein the selected dedicated storage location is associated with the user and contains only sales receipt documents; and
transmitting the document to a cloud storage system for storage in the selected dedicated storage location.

8. The method of claim 7, wherein the document is an attachment to an email message.

9. The method of claim 7, wherein obtaining the document includes monitoring, without action by the user, an email account associated with a user to detect that an email message has been received at the email account associated with the user, and storing a copy of an email attachment from the email message as the document.

10. The method of claim 7, wherein the document is a photograph.

11. The method of claim 10, wherein obtaining the document includes monitoring, without action by the user, a collection of photographs that are associated with the user and storing a copy of a newly added photograph from the collection of photographs as the document.

12. An apparatus comprising:
a memory; and
a processor configured to execute instructions stored in the memory to:
obtain a document that is associated with a user,
extract one or more features from the document, wherein the one or more features are alphanumeric text-based features that include at least one of text size, text font, text positioning, or substantive text content,
compare the one or more features from the document to receipt feature information describing features extracted from a collection of sales receipts,
determine that a document type of the document is a sales receipt from a plurality of known document types based on the comparison of one or more features from the document to the receipt feature information,
select a dedicated storage location at a cloud storage system from a plurality of dedicated storage locations associated with the user based on the determination that the document is a sales receipt, wherein each of the plurality of dedicated storage locations corresponds to a respective folder of a hierarchical storage structure of the cloud storage system, and wherein the selected dedicated storage location is associated with the user and contains only sales receipt documents, and
transmit the document to a cloud storage system for storage in the selected dedicated storage location that is associated with the user.

13. The apparatus of claim 12, wherein the document is an attachment to an email message.

14. The apparatus of claim 12, wherein obtaining the document includes monitoring, without action by the user, an email account associated with a user to detect that an email message has been received at the email account associated with the user, an email message and storing a copy of an email attachment from the email message as the document.

15. The apparatus of claim 12, wherein the document is a photograph.

16. The apparatus of claim 15, wherein the processor executes further instructions to obtain the document by monitoring, without action by the user, a collection of photographs that are associated with the user and storing a copy of a newly added photograph from the collection of photographs as the document.

* * * * *